United States Patent [19]

Celia

[11] Patent Number: 4,919,746
[45] Date of Patent: Apr. 24, 1990

[54] APPARATUS FOR BONDING A LOW DENSITY MATERIAL TO A PLASTIC SUBSTRATE

[76] Inventor: Wayne M. Celia, 242 Purdue Ct., Paramus, N.J. 07652

[21] Appl. No.: 308,532

[22] Filed: Feb. 10, 1989

Related U.S. Application Data

[62] Division of Ser. No. 206,709, Jun. 15, 1988, Pat. No. 4,854,993, which is a division of Ser. No. 97,655, Sep. 17, 1987, Pat. No. 4,794,030.

[51] Int. Cl.⁵ .............................................. B32B 31/16
[52] U.S. Cl. .................................... 156/359; 156/362; 156/553; 156/556; 156/581
[58] Field of Search ............... 156/290, 292, 209, 219, 156/556, 499, 553, 220, 73.1, 581, 582, 358, 359, 350, 351

[56] References Cited

U.S. PATENT DOCUMENTS

| | | | |
|---|---|---|---|
| 2,306,256 | 12/1942 | Wickwire et al. | 156/219 |
| 3,962,007 | 6/1976 | Heimberger | 156/73.1 |
| 4,310,377 | 1/1982 | Lorenz | 156/499 |
| 4,798,639 | 1/1989 | Yamaguchi | 156/219 X |

Primary Examiner—David Simmons
Attorney, Agent, or Firm—Lerner, David, Littenberg, Krumholz & Mentlik

[57] ABSTRACT

An apparatus for and a method of bonding low density or thin gauge polyurethane foams to polypropylene substrates, said apparatus including, a revolvable turntable for indexing the workpieces to various work stations, a conductive heating station to heat-liquify designated areas of the polypropylene substrate, and a compression station having compression platens to emboss the polyurethane foam onto the polypropylene substrate effectively fusing the fibers of the polyurethane foam with the heat-liquified areas of polypropylene. The method generally includes the steps of, engaging the surface of a precut polypropylene substrate with a heated member for a predetermined period of time to cause the polypropylene to heat-liquify at the points of contact forming a raised quantity of melted polypropylene, removing the heated member from contact with the polypropylene, placing a pre-cut sheet of polyurethane foam into contact with the melted polypropylene, applying pressure to the polyurethane foam so as to fuse the fibers thereof with the melted polypropylene, and permitting the fused polyurethane and polypropylene to cool effectively bonding them together.

8 Claims, 10 Drawing Sheets

FIG. 5
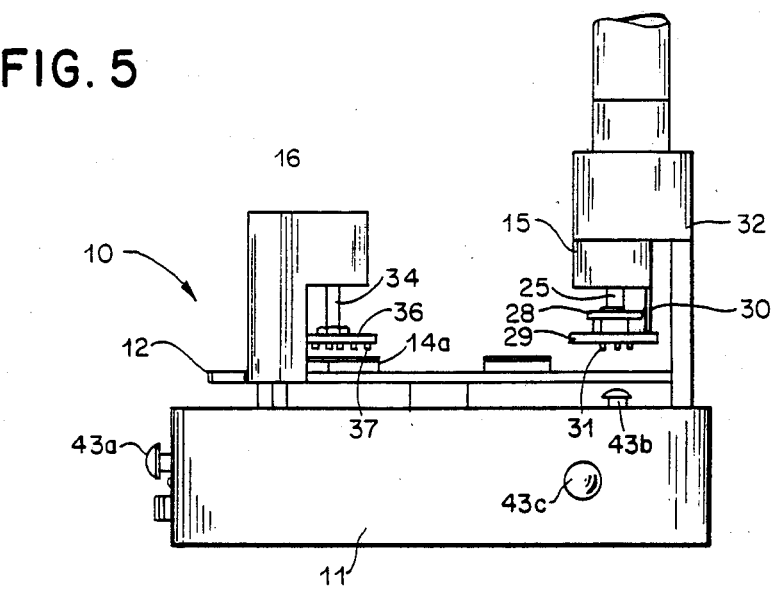
FIG. 6
FIG. 7
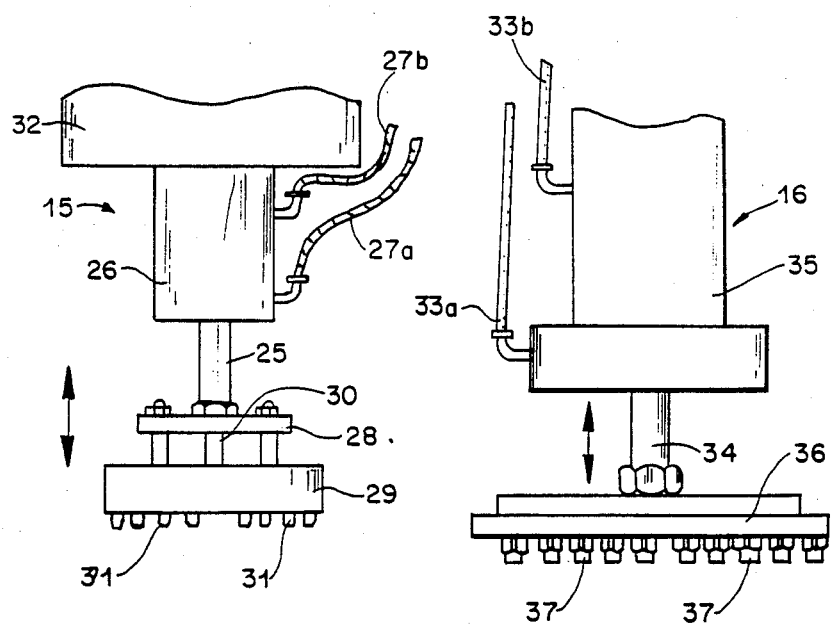

APPARATUS FOR BONDING A LOW DENSITY MATERIAL TO A PLASTIC SUBSTRATE

This is a division, of application Ser. No. 07/206,709, filed 06/15/88, now U.S. Pat. No. 4,854,993, which is a division of Ser. No. 07/097,655 filed 9/17/87 now U.S. Pat. No. 4,794,030.

BACKGROUND OF THE INVENTION

This invention relates to a method of and an apparatus for making a composite laminated structure comprised particularly of a sheet of polyurethane foam or other material which is similarly low in density and a polypropylene substrate or the like.

Thermoplastic plastics, particularly polypropylene, portray a variety of favorable characteristics and properties including that of being easily molded and that of chemical inertness; and thus, such plastics are ideal for a plurality of applications. Such plastics are also comparitively inexpensive, and therefore particularly desirable for use in the manufacturing of articles of commerce adapted as disposable packages for food and health and beauty aids. However, in certain packaging applications, for instance where chemical compositions are involved, the item or composition being packaged will not readily adhere to the plastic, as might be required, because of the properties of the plastic and/or the composition itself. An example of such a packaging application is where a polypropylene material is used to form a dispensing container for a solid anti-perspirant/deodorant composition.

It is these packaging applications which require some means to ensure that all compositions adhere to the polypropylene in the desired areas. The inventor herein has discovered that fixing a layer of polyurethane foam to the polypropylene is the most inexpensive and perhaps only means of accomplishing the above. When this concept is reduced to practice, all such solid compositions will readily adhere to the layer of polyurethane foam, and therefore will become fixed in relation to the polypropylene. Without such a structure, the use of polypropylene materials in the above mentioned packaging applications might not be possible or feasible from the viewpoint of cost and benefit derived therefrom.

The problem arises, however, as to the proper mechanical technique to effect the bonding of the polyurethane foam to the polypropylene. Techniques for laminating plastic resin materials are well known in the art, and include methods and apparatus by which the plastic resin material, in its entirety, is heated and the covering material is subsequently rolled or compressed on the plastic resin material in its softened state.

Thus, U.S. Pat. No. 3,533,866 discloses a method which uses a flame laminator to heat and tackify polyolefin fiber batts which are immediately laminated to a layer of flexible polyurethane foam. Similarly, U.S. Pat. No. 3,318,744 discloses a method which utilizes elongated ribbon type flames issued from a plurality of orifices to heat the surface of a polyurethane foam material which is held under tension (so as not to wrinkle). A reenforcement layer is then laminated to the polyurethane foam with a reenforcement layer. The apparatus and method disclosed in these Patents, however, are dangerous, costly, require strict supervision. Moreover, such apparatus and methods are ineffective where the polyurethane foam is of particularly low density or of relatively thin gauge.

U.S. Pat. Nos. 3,062,698 and 4,225,376 teach methods by which a covering material is heated to a temperature above the melting point of a foam thermoplastic resin, on which the covering material is immediately pressed. The methods disclosed in these patents are ineffective because they heat and soften the entire material on which the foam is to be pressed, thus deforming the shape and critical dimensions of the material.

U.S. Pat. No. 4,356,012 teaches a method which uses a heated die with a central relief groove to seal a hydrophobic filter material to a urinary bag made of polyvinyl chloride. This method is inapplicable for bonding a sheet of polyurethane foam to a polypropylene substrate because it calls for the direct sealing of two materials together, the first of which is a filter screen made of a material which is resistant to heat.

Although not shown specifically in the prior art, it should be noted that the use of a glue or an epoxy to effect the desired bonding between the foam and polypropylene substrate has been unsuccessful for two reasons. First, the types of glues and epoxies which will adhere to polypropylene plastics are limited. Secondly, the surface area of the foam susceptible to such bonding is minimal and therefore any bond which might be made is correspondingly weak. Further, gluing or epoxying smaller items can be tedious and expensive from the standpoint of manufacturing, requiring long periods of time for drying and completing the bond.

The present invention is directed to an apparatus for and a method of bonding particularly low density or thin gauge materials to substrates made of polypropylene or the like to form a composite laminated structure in which the structure, characteristics and properties of the polyurethane foam and the polypropylene substrate are not substantially altered thereby.

The broad method of bonding thin layers of low density materials to a polypropylene substrate in accordance with the present invention can be varied and altered for adaptation to a variety of manufacturing applications. By employing the apparatus and method herein, any material which has heretofore resisted bonding to polypropylene or the like, or requires expensive techniques to effect such bonding, can be readily and inexpensively bonded thereto.

The composite laminated structure obtained by the method and apparatus of the present invention can be used in the construction of many products, and in particular, to products requiring polyurethane foam as a protective cushion or to anchor a composition to a relatively strong polypropylene casing or container which can be adapted, prior to bonding the polyurethane foam thereto, for snap-fit assembly or any other means of fastening.

SUMMARY OF THE INVENTION

The present invention broadly contemplates an apparatus for bonding to a polypropylene substrate low density or thin gauge materials which have heretofore resisted such bonding by conventional methods, said apparatus comprising, an indexing turntable having, a workpiece holder to receive, for example, a polypropylene substrate and a sheet of polyurethane foam, a conductive heating station, a compression station, means to rotate said workpiece holder into alignment with a respective work station, and means to regulate the time in which the workpiece holder dwells at a given work station. The conductive heating station is situated interiorly adjacent to the perimeter of the turntable, and includes, a pneumatically controlled descendible and retractable plate member having at least one welding iron thereon, means for heating said plate member and at least one welding iron to a predetermined temperature, means for synchronizing the descending and retracting movement of the plate member with the rotary movement of the turntable, and an exhaust duct to draw off any harmful fumes which might be generated by contacting the welding iron to the plastic substrate. The compression station is similarly situated interiorly adjacent to the perimeter of the turntable at a predetermined angular distance from the conductive heating station, and includes, a pneumatically controlled descendible and retractable compression platen having at least one individual platen to emboss the low density material into the plastic substrate at the point at which the welding iron softened and raised the plastic, and means for synchronizing the descending and retracting movement of the compression platen with the rotary movement of the indexing table.

Additionally, the apparatus as above described wherein a storage hopper and/or a robotic arm are operatively associated with the turntable for automated placement of the plastic substrate in the workpiece holder. Further, safety shields having emergency shut-off switches which are activated when the shields are contacted are provided at the foam placement station and at the substrate placement station providing a hopper or robotic system are not utilized.

In addition, the present invention particularly contemplates a method whereby the apparatus as above described is implemented, said method comprising the steps of, engaging the surface of a plastic substrate with at least one welding iron for a predetermined period of time sufficient to cause the contacted surface to soften only at the points of contact, removing said at least one welding iron, placing a sheet of low density or thin gauge material on the surface of the plastic substrate having the softened areas thereon, embossing the low density material onto the plastic substrate at the softened areas thereof to fuse the low density material into the softened areas of the substrate, and allowing the fused low density material and plastic substrate to cool, effectively bonding the materials to form a composite laminated structure.

Accordingly, it is an object of the present invention to provide an apparatus for manufacturing a composite laminated structure consisting of a material which is of particularly low density or thin gauge and a polypropylene material or the like.

It is another object of the present invention to provide a specific method by which the above described apparatus or any other suitable apparatus can be implemented to effectively bond materials of low density or thin gauge to a polypropylene substrate.

It is another object of the present invention to provide an apparatus for and a method of bonding polyurethane foam to a polypropylene substrate without rendering useless the molded structure of the polypropylene substrate or destroying the desirable characteristics of the polyurethane foam.

It is another object of the present invention to provide an apparatus for and a method of bonding polyurethane foam to a polypropylene substrate which is substantially automated requiring only a minimal degree of supervision and participation by the operator.

It is yet another object of the present invention to provide an apparatus for and a method of bonding a material of low density or thin gauge to a plastic substrate wherein the structure and operation of the apparatus and the steps of the method are easily controlled and varied as may be required for particular applications and for the particular materials being bonded into a composite laminated structure.

These and other objects will become apparent, as will a better understanding of the concepts underlying the present invention by reference to the detailed description which follows below and is to be studied in conjunction with the drawings.

BRIEF DESCRIPTION OF THE DRAWINGS

FIG. 5 is a right side view of the indexing turntable and bonding apparatus shown in FIG. 1, wherein the indexing turntable has been rotated.

FIG. 6 is a front elevational view of the conductive heating assembly shown at the heating station of the indexing turntable and bonding apparatus in FIG. 1.

FIG. 7 is a front elevational view of the compression platen assembly shown at the compression station of the indexing turntable and bonding apparatus in FIG. 1.

DESCRIPTION OF THE INVENTION

Figure 1:
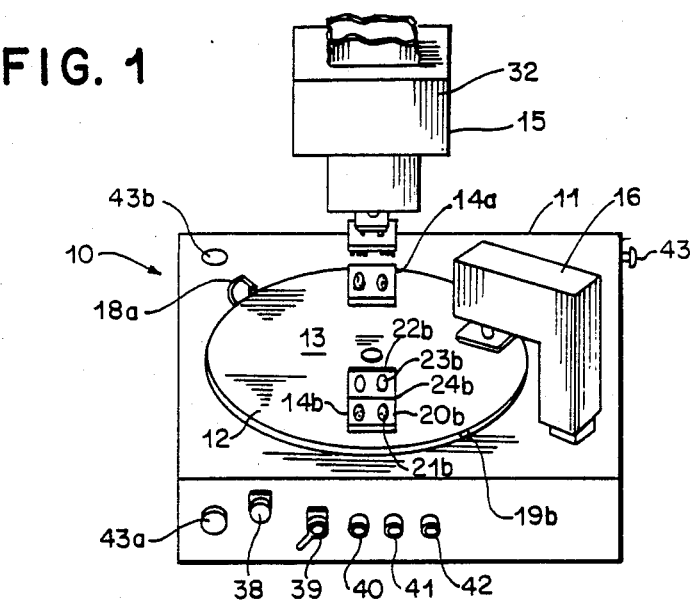
FIG. 1 is a perspective view of an indexing turntable and bonding apparatus including two workpiece holders, a conductive heating station and a compression station, all in accordance with the present invention.

Referring to the drawings, FIGS. 1-5 show a sealing apparatus generally designated as 10 and including, a base 11, an indexing turntable 12 having on its upper platform surface 13 workpiece holders 14a and 14b, a conductive heating assembly 15, and a compression platen assembly 16. The structural details of the heating assembly 15 and the compression platen assembly 16 are shown in FIGS. 6-7 and 10-11.

The indexing turntable 12 of the sealing apparatus 10 is rotatably connected at its center to the base 11 by means of a rotatable shaft 17, which transmits the rotational energy of a pneumatically controlled air motor (not shown) to the turntable 12. Operatively associated with the pneumatically controlled air motor are a limit switch and a time relay which together control the movement of turntable 12. The rotation of turntable 12 is synchronized with the operation of conductive heating assembly 15 and compression platen assembly 16 by means of proximity switches 18a and 18b. Proximity switches 18a and 18b, best shown in FIGS. 1 and 2, include conventional sensing devices to detect the metal nibs 19a and 19b located on the peripheral edge of turntable 12. When the metal nibs 19a and 19b are detected, a signal is transmitted to the conductive heating assembly 15 or compression platen assembly 16 to cause the heads thereof to descend for a predetermined period of time, that is, a dwell period. Simultaneously, the time set on the time relay expires and the limit switch stops rotation of the table. It is imperative to note the location of the workpiece holders 14 in relation to metal nibs 19 since it is this arrangement which dictates the descending movement of the heads of the conductive heating assembly 15 or compression platen assembly 16 when the table 12 is stopped and the workpiece holders 14 are thereunder.

Figure 2:
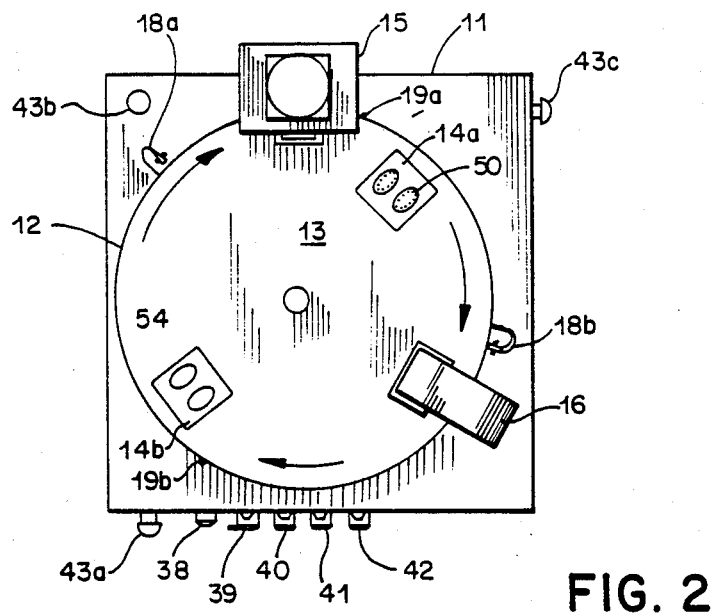
FIG. 2 is a top plan view of the indexing turntable and bonding apparatus shown in FIG. 1, wherein the indexing turntable has been rotated.
Figure 3:
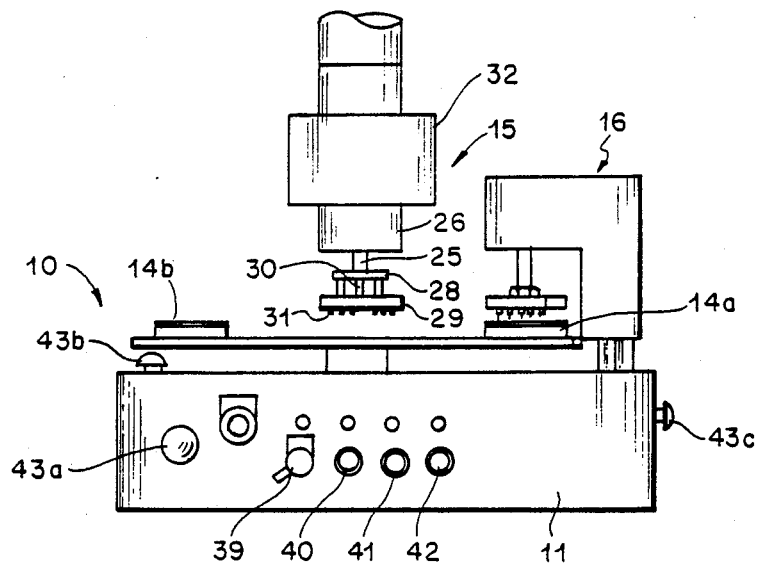
FIG. 3 is a front elevational view of the indexing turntable and bonding apparatus shown in FIG. 1, wherein the indexing turntable has been rotated.
Figure 4:
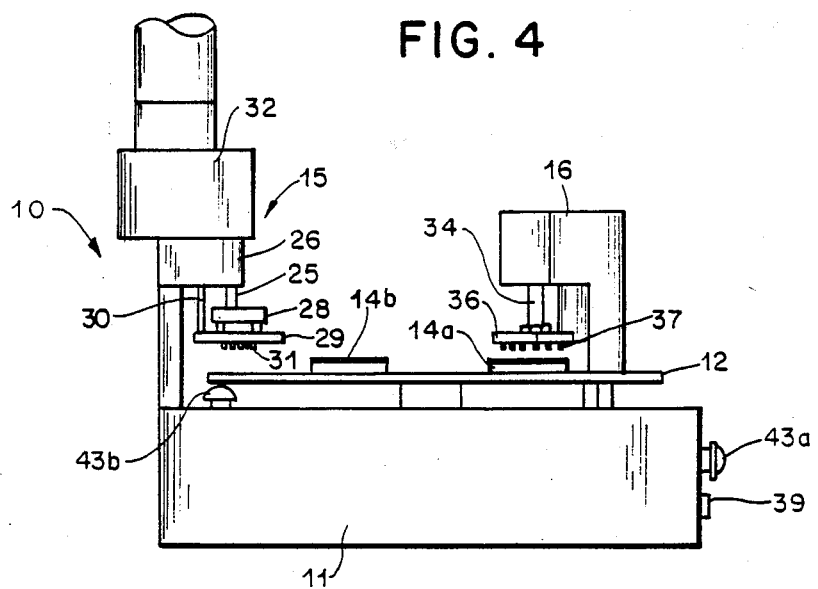
FIG. 4 is a left side view of the indexing turntable and bonding apparatus shown in FIG. 1, wherein the indexing turntable has been rotated.

The workpiece holders 14 can vary in size and shape depending upon the size, shape and type of materials which are to be held therein for bonding. In the embodiment shown herein, the workpiece holders 14a and 14b are each capable of securing two oval shaped workpieces such as those illustrated in FIGS. 14-18. As shown in FIGS. 1 and 2, workpiece holders 14 include base means 20 having oval shaped depressions therein, a cover 22 having oval shaped openings for alignment with said oval shaped depressions in said base means when the cover 22 is closed and hinge means 24 connecting the cover 22 to the base means 20.

In the illustrated embodiment, workpiece holder 14a is diametrically opposed to workpiece holder 14b, however, workpiece holders 14 can be situated in any suitable arrangement or additional workpiece holders can be fixed to the upper surface 13 of the turntable platform as long as metal nibs 19 are installed in the correct locations so as to properly index the workpiece holders beneath the conductive heating assembly 15 or the compression platen assembly 16. Of course, the number and arrangement of the workpiece holders will depend upon the size and type of workpiece and the dwell period and indexing period.

Figure 8A:
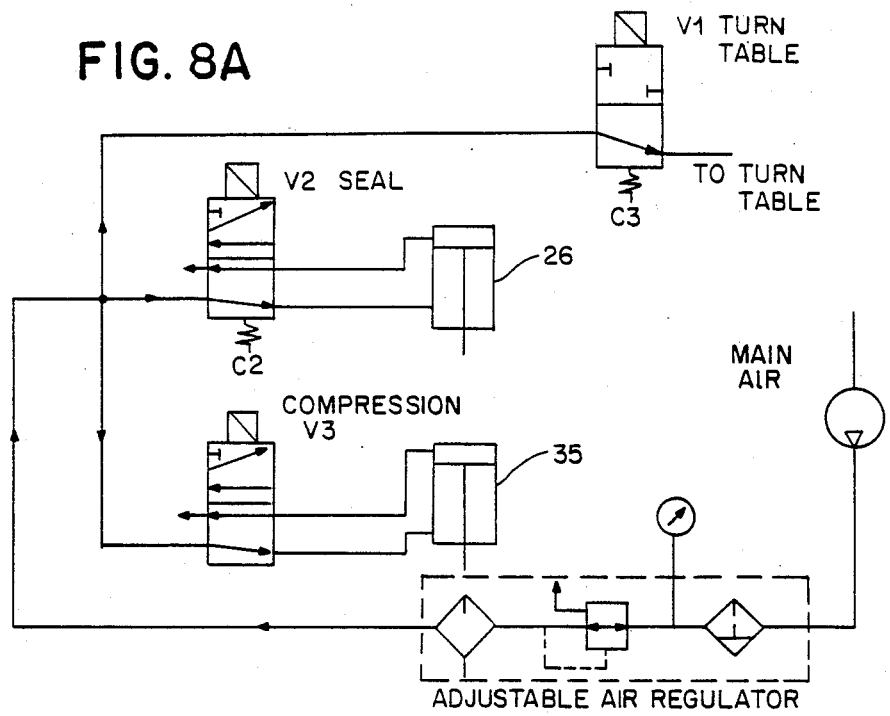
FIG. 8a is a diagrammatical depiction of the pneumatic system which operates the indexing turntable and the conductive heating assembly and compression platen assembly shown in FIGS. 6 and 7, respectively.

The conductive heating assembly 15 of the present invention includes a descendible and retractable rod member 25 and cylinder 26 which coact in a piston-type arrangement. Air lines 27a and 27b introduce air into the cylinder 26 as the fluid medium by which a slide-valve arrangement in the cylinder 26 is actuated to forceably lower and retract rod member 25. The pneumatic system of which air lines 27a and 27b are integral parts is shown in FIG. 8a and will be discussed below.

Figure 9B:
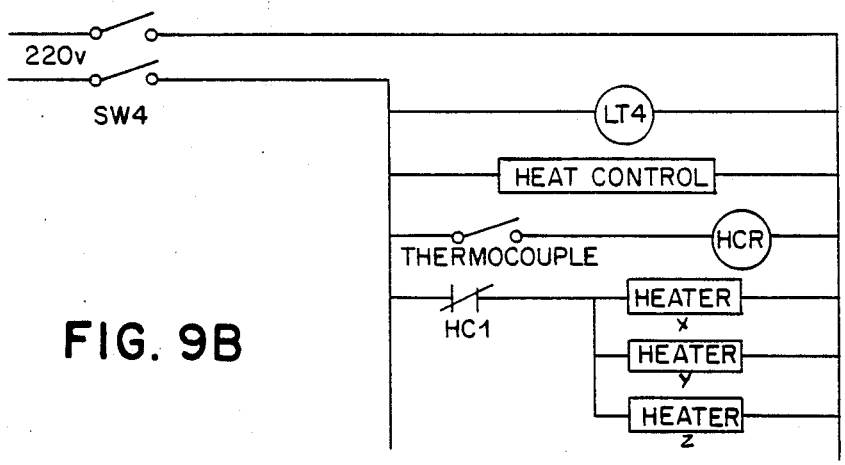
FIG. 9b is a schematic diagram of the electrical system which operates the heating unit within the conductive heating assembly shown in FIG. 6.
Figure 10:
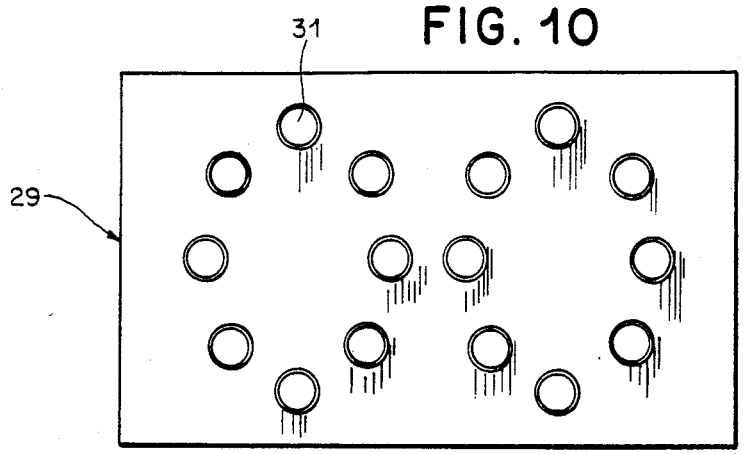
FIG. 10 is a bottom plan view of the conductive heating assembly shown in FIG. 6, illustrating in particular the heating elements thereof.

A first plate member 28 is fixed to rod member 25 at the lower end thereof for movement therewith. A second plate member 29 is fixed to the first plate member 28 by any suitable fastening means so as to provide a gap between first plate member 28 and second plate member 29. A heat conduit member 30 heats second plate member 29 to a predetermined temperature which can be precisely maintained by the use of a thermocouple which continuously sends a signal to a thermoswitch or the like. A schematic diagram of the heating elements which heats heat conduit member 30 is shown in FIG. 9b. In turn, the second plate member 29 conductively transmits the heat to a plurality of welding irons or contact heads 31 which are fastened thereto or made integral therewith. FIG. 10 shows a bottom view of second plate member 29 with welding irons 31 fixed thereto in a pattern specifically adapted for bonding the workpieces shown in FIGS. 14-18. It should be noted that the gap between first plate member 28 and second plate member 29 is provided prevent first plate member 28 and rod member 25 from becoming heated.

Figure 10A:
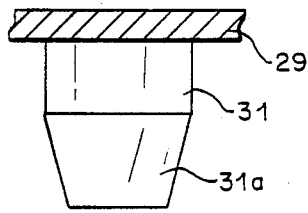
FIG. 10a is an enlarged broken away side view of an individual heating element, illustrating in particular the shape thereof.

It is particularly noted that welding irons 31 have tapered points 31a, as clearly shown in FIG. 10a. This configuration is particularly important in preparing a plastic substrate for bonding with a polyurethane foam since it is the means by which the softened plastic material will be raised so as to form a circular bead of molten plastic about the contact head 31, which bead remains after the contact head 31 retracts. The advantage conferred by this tapered point 31a will become more apparent from the description of the melting technique which follows below.

It is to be further noted that the welding irons are made of aluminum since materials such as brass retain the residue of the plastic after contact therewith, and therefore the contact heads 31 have to be cleaned even after a short term of usage. The use of materials such as brass also inhibit the formation of the circular bead of softened plastic material. Aluminum contact heads, however, provide for the efficient melting of the plastic material with minimal residual deposits, thus forming full and clean circular softened areas.

As with any metal material used to melt plastics such as polypropylene, harmful fumes and vapors are emitted, thus an exhaust duct 32 is provided to draw off any such harmful fumes or vapors.

FIG. 7 shows the compression platen assembly 16 which also operates on the basis of a piston-type arrangement.

Figure 11:
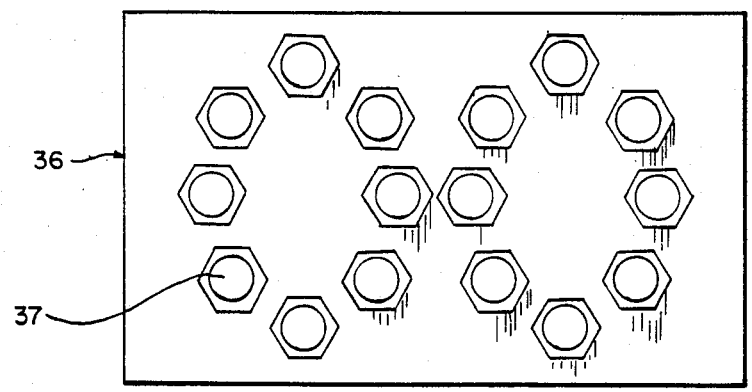
FIG. 11 is a bottom view of the compression platen assembly shown in FIG. 7, illustrating in particular the compression platens thereof.
Figure 11A:
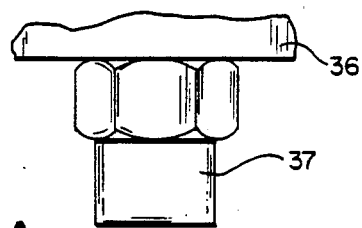
FIG. 11a is an enlarged broken away side view of an individual compression platen.

Thus, air hoses 33a and 33b are part of the pneumatic system depicted in FIG. 8a which effects the descendible and retractible movement of compression rod member 34 which is housed within the compression cylinder 35. Fixed to the lower end of compression rod member 34 is compression plate member 36 which includes a series of individual compression platens 37, the pattern of which matches the pattern of the welding irons 31, as can be seen by comparing FIG. 10 and FIG. 11. As shown in FIGS. 11 and 11a, the individual compression platens 37 are of a diameter which is greater than the diameter of the tapered points 31a of welding irons 31 to ensure that the entire circular bead of softened plastic formed by heat treatment of the plastic substrate is embossed by the individual compression platen 37. The individual compression platens 37 can be formed from any suitable material such as aluminum or a high density rubber material.

The various elements of the bonding apparatus 10 are activated by means of the switches mounted on the front of base 11, wherein power switch 38 opens the AC power source, heat switch 39 activates the heating element 30 to conductively transfer heat to the welding irons 31, turntable switch 40 commences rotation of the turntable 12, sealing switch 41 activates the portion of the pneumatic system which controls conductive heating assembly 15, compression switch 42 activates the portion of the pneumatic system which controls compression platen assembly 16, and emergency switch 43a terminates operation of the bonding apparatus 10 in the case of an emergency by cutting off the power thereto. Emergency switches 43b and 43c are respectively provided on the top and side surfaces of base 11 for the same purpose as emergency switch 43a.

Once the proximity switches and time relays have been set for the desired application, bonding apparatus 10 is easily operated by first depressing power switch 38 and then turning heat switch 39 to heat welding irons 31. The temperature of second plate member 29 and welding irons 31 can be indicated on a digital or analog thermometer which is in line with the thermocouple and once the predetermined temperature has been reached the remaining devices of bonding apparatus 10 can be activated by opening the aforementioned switches. It should be noted that the devices of bonding apparatus 10 are capable of independent operation so that the various phases of operation can be explored and examined on an experimental basis.

Figure 8B:
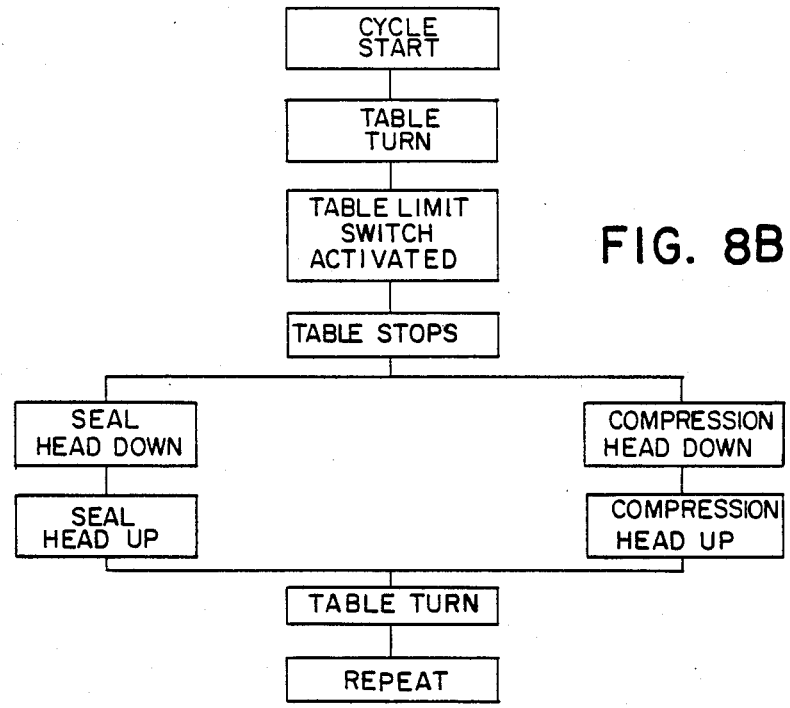
FIG. 8b is a flow chart illustrating the sequence in which the elements of the apparatus of the present invention are activated.

Of course, the descending and retracting movement of the welding irons 31 and the compression platens 37 must be coordinated with the rotation of indexing turntable 12 in accordance with the desired bonding application. This coordination is accomplished by operatively associating the pneumatic system schematically illustrated in FIG. 8a with the electrical system schematically illustrated in FIG. 9. The flow chart in FIG. 8b summarizes the coordination of the various elements of the apparatus 10.

Figure 9A:
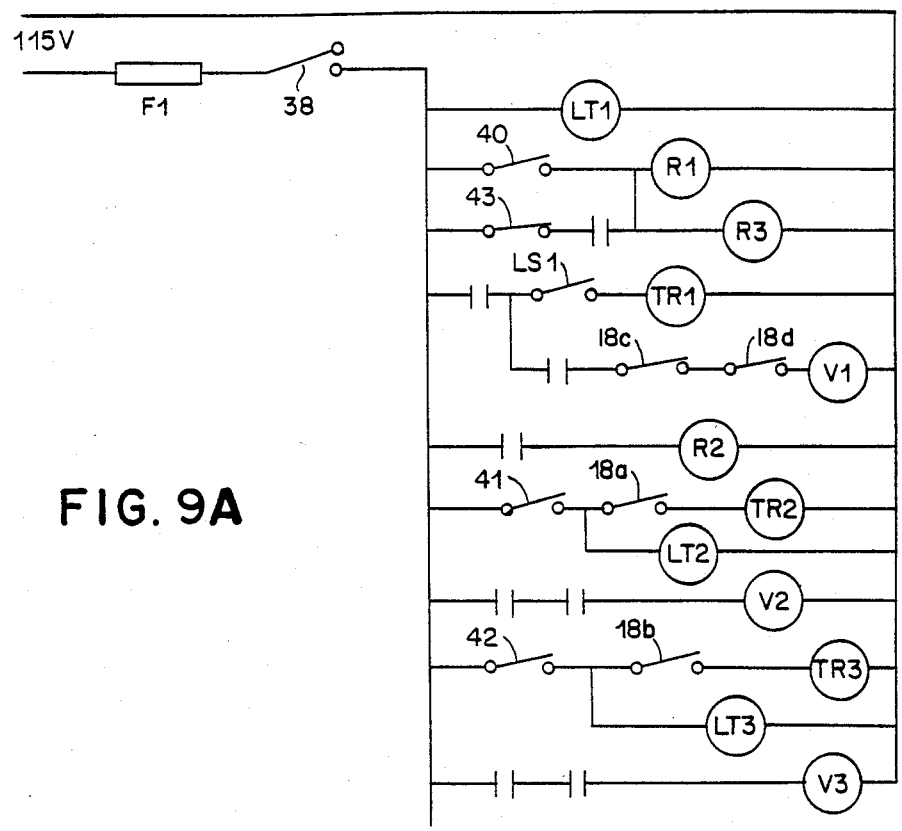
FIG. 9a is a schematic diagram of the electrical system which operates the indexing turntable and bonding apparatus shown in FIG. 1.

Thus, reference to FIG. 9a shows a 115 V power source which is protected by a three ampere fuse F1. This power is supplied to the coils on relays R1 and R3 by closing power switch 38. Turntable switch 40 is then closed to commence rotation of the turntable 12 and the cycle of the apparatus. It should be noted that emergency switch 43 is normally closed to permit relay R3 to be energized. Lights LT1, LT2 and LT3 indicate when the respective elements of the apparatus 10 are receiving power.

A cam member (not shown) on the turntable 12 then activates limit switch LS1 which energizes timer relay coil TR1 for a predetermined period of time permitting the coil on relay R2 to be energized. As the contacts of relay R2 open the air to the table air valve V1 is interrupted to stop the rotation of the turntable 12.

Once the predetermined period of time is completed, time relay TR1 opens and causes R2 to close, whereby power is reinstated to table air valve V1 to resume the rotation of the turntable 12.

Safety proximity switches 18c and 18d are provided within conductive heating assembly 15 and the compression platen assembly 16 to ensure that the heads thereof are in their uppermost positions before rotation of the turntable 12 is resumed.

The operation of the conductive heating assembly 15 and the compression platen assembly 16 are integrated with the rotation of the turntable 12 by activating, respectively, sealing switch 41 and compression switch 42. As discussed above, the proximity switches 18a and 18b will read their respective metal nibs 19a and 19b to supply power to the timer relay TR2 (for the conductive heating assembly 15) and the timer relay TR3 (for the compression platen assembly 16), for commencing the movement thereof.

Thus, after time relay TR2 is activated, power supplied to the conductive air valve V2 whereby the welding irons 31 will descend for contact with the workpiece for the length of time (dwell time) set on the timer relay TR2. The compression air valve V3 causes the compression platens 37 to descend in the same manner once time relay TR3 is activated.

FIG. 9b shows the heat circuit which regulates the temperature of the welding irons 31, in which the power source is 220 V single phase supplied through a double pole switch SW4 and is indicated on light LT4. This power is fed to the three 220 V heating elements X, Y and Z. The thermocouple, fixed on the second plate member 29, continuously senses the temperature of the second plate member 29 and the welding irons 31. When the temperature set on the heat control is reached, the power to the heat control relay HCR is interrupted, opening the contacts HC1 to cut off the power to the heating elements X, Y and Z. The power to the relay HCR is cut off once the thermocouple senses a temperature below the desired temperature so that the contacts HC1 are again closed to permit power to the heating elements X, Y and Z. This process is in operation continuously to maintain the welding irons 31 at the desired temperature.

Referring to the pneumatic diagram illustrated in FIG. 8a, the main air travels into the adjustable air regulator in which the desired pressure is set and supplies air at the desired pressure to the turntable valve V1, the sealing valve V2 and the compression valve V3, all through normally closed ports. Prior to travelling to the valves, the air passes through an oiler in which a portion of the oil therein vaporizes and is mixed with the air to lubricate the cylinders of the valves.

Turntable valve V1 is a two-way electrical coil activated pneumatic valve whereby the activation of the electrical coil C1 interrupts the air flow to turntable valve V1 to stop rotation of the turntable 12.

The air flowing to sealing valve V2, a four-way electrical coil activated pneumatic valve, normally maintains the sealing head in its uppermost position. Upon activation of the electrical coil C2, however, the air flow is reversed, permitting the air to flow into the top of the cylinder 26 to force the sealing head and welding irons 31 downward for contact with the workpiece. This, of course, occurs when metal nib 19a is detected by proximity switch 18a.

Compression valve V3 operates in the same manner as sealing valve V2 to drive the compression platens 37 onto the workpiece.

A full cycle of operation of the apparatus 10 is shown in the flow chart in FIG. 8b. This flow chart shows the activation of the table limit switch LS1., the stopping of the turntable 12, the descending and detracting movement of both the sealing head and the compression head, and the rotation of the turntable between the sealing station and the compression station.

Figure 15:
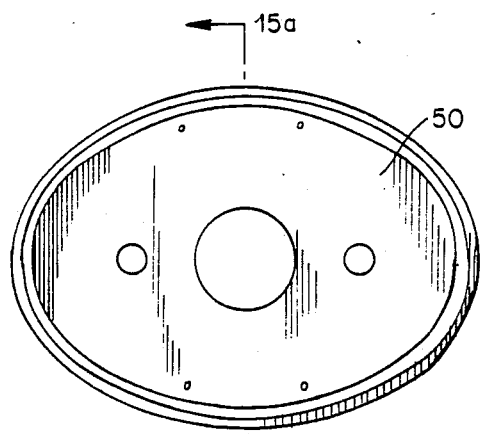
FIG. 15 is a top plan view of a polypropylene substrate, wherein the molded structure thereof is adapted for snap-fit engagement with other polypropylene parts to form a container.

To place the apparatus of the present invention into practice with the method of the present invention, the basic steps of which are shown in FIG. 8b, two substrates of the type shown in FIG. 15 and generally designated as 50 are placed into workpiece holder 14a at loading station A. These substrates are made from any type of thermoplastic plastic such as polypropylene, and placement of the same into the workpiece holder 14a can be accomplished manually by an operator located at loading station A or by means of an automatic hopper system in conjunction with a robotic transfer assembly, or any other suitable means. Once the substrates 50 are in position within the oval-shaped depressions 21a of the workpiece holder 14a the cover 22a is to be closed to secure the plastic substrate or workpiece 50 about the perimeter thereof and expose the upper surface of workpiece 50 through oval-shaped openings 23a.

The workpiece holder 14a is then rotated towards the conductive heating station as the turntable 12 revolves. Once the workpiece holder 14a is aligned beneath the conductive heating assembly 15 the limit switch LS1 stops the turntable 12 and metal nib 19a, located on the periphery of turntable 12, will be in alignment with proximity switch 18a, the sensor of which will read the metal of metal nib 19a and cause the head of conductive heating assembly 15 to descend. This is accomplished by means of 80 PSI of air being introduced into cylinder 26 to forceably effect the descent of the welding irons 31 which have been heated by heat transfer member 30.

It has been found that the air pressure utilized to effect the descendible and retractible movement of welding irons 31 or compression platens 37 is not particularly critical. However, it has also been found that welding irons 31 should be heated to a temperature of approximately 650° Farenheit when used in association with plastics such as polypropylene, especially where the dwell period is in the order of 2.5 seconds and the polypropylene substrate to be contacted is relatively thin, perhaps in the order of 0.050 gauge. The thickness of the plastic substrate, the depth to which the welding irons 31 will melt into the substrate and the time of the dwell period must all be considered and coordinated when determining the temperature of the welding irons 31 and the dwell period.

Figure 12A:
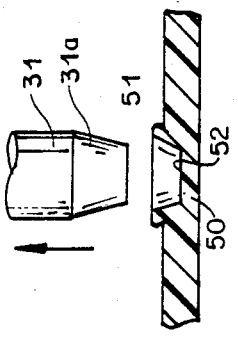
FIG. 12a is a broken away cross-sectional side view of an individual heating element and polypropylene substrate before the heating element contacts the substrate at the conductive heating station on the indexing turntable and bonding apparatus of FIG. 1.
Figure 12B:
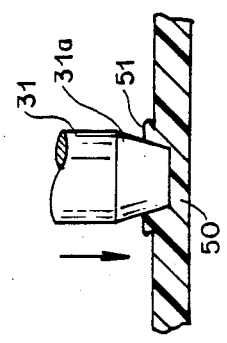
FIG. 12b is a broken away cross-sectional side view of the individual heating element and polypropylene substrate shown in FIG. 12a where the individual heating element begins its contact with the substrate.
Figure 12C:
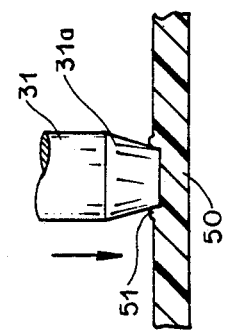
FIG. 12c is a broken away cross-sectional side view of the individual heating element and polypropylene substrate shown in FIG. 12a during the dwell period where the individual heating element is at a predetermined depth within the polypropylene substrate, illustating in particular the formation of a raised quantity of softened polypropylene about the individual heating element.

Referring specifically to FIGS. 12a–12c, the descending movement of a single welding iron 31 is shown. Thus, FIG. 12b shows the tapered point 31a of welding iron 31 as it contacts the polypropylene workpiece 50. The manner in which the polypropylene is softened and raised, shown as at bead 51, should be particularly noted. As the welding iron 31 descends to its maximum depth within polypropylene substrate 50, shown in FIG. 12c, this softened bead 51 continues to flow upwardly and "roll" outwardly from the tapered point 31a of welding iron 31. The tapered configuration of the welding iron 31 enhances this "rolling" action partially by means of the angle surface and partially because of the high concentration of heat exhibited at the tapered point 31a.

Figure 12D:
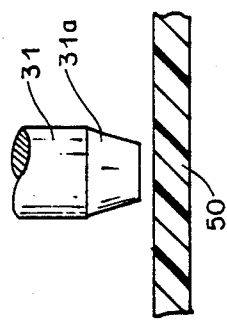
FIG. 12d is a broken away cross-sectional side view of the individual heating element and polypropylene substrate shown in FIG. 12a showing the individual heating element removed from the polypropylene substrate leaving a depression of predetermined depth and most importantly a raised quantity of softened polypropylene as formed about the individual heating element during the dwell period.

Once the welding iron 31 has reached its maximum depth within polypropylene substrate 50, air is introduced into cylinder 26 to effect the retracting movement of the welding irons 31 and the remainder of the moving elements of the heating assembly 15, as shown in FIG. 12d.

Figure 16:
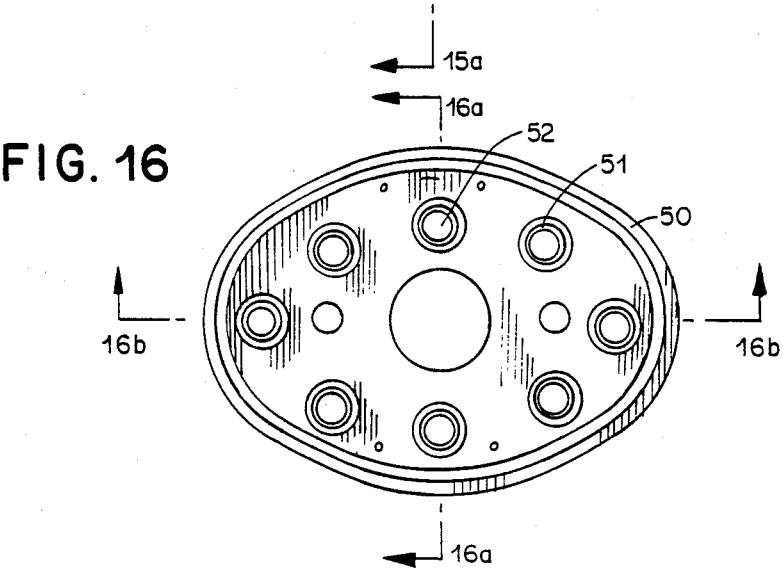
FIG. 16 is a top plan view of the polypropylene substrate shown in FIG. 15 after heat treatment of the same in accordance with the technique illustrated in FIGS. 12a-12d, illustrating in particular the softened and raised areas of polypropylene.
Figure 18:
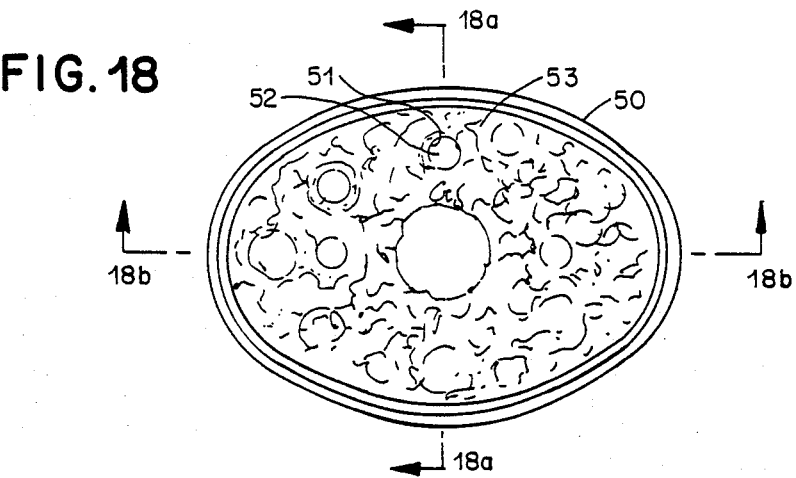
FIG. 18 is a top plan view of the composite laminated structure resulting from compressing the polyurethane foam, raised and softened beads and the polypropylene substrate shown in FIG. 17 in accordance with the technique illustrated in FIGS. 13a-13d.
Figure 15A:
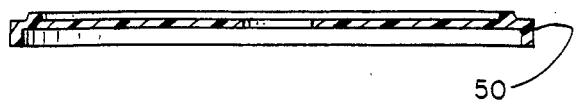
FIG. 15a is an enlarged cross-sectional side view of the polypropylene substrate shown in FIG. 15 as taken on line 15a—15a thereof.
Figure 16A:
FIG. 16a is an enlarged cross-sectional side view of the heat treated polypropylene substrate shown in FIG. 16 as taken on line 16a—16a thereof.
Figure 16B:
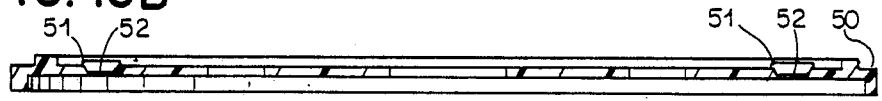
FIG. 16b is an enlarged cross-sectional side view of the polypropylene substrate shown in FIG. 16 taken on line 16b—16b thereof.
Figure 18B:
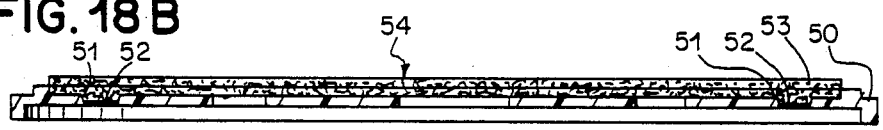
FIG. 18b is an enlarged cross-sectional side view of the composite laminated structure shown in FIG. 18 taken on line 18b—18b thereof.

FIG. 12d further shows the depression 52 formed by the tapered point 31a of welding iron 31 as well as the raised and softened area of polypropylene or bead 51. FIG. 16 shows a top plan view of the polypropylene workpiece 50 immediately following treatment of the same at the conductive heating assembly 15. Thus, an oval-shaped pattern of eight circular depressions 52 and the raised circular beads 51 of softened polypropylene material. FIGS. 16a and 16b show cross-sections of the polypropylene substrate shown in FIG. 16, in which select depressions 52 and beads 51 are shown.

It is to be particularly noted that the structure and elements of polypropylene substrate 50 have not been damaged or affected in any way following treatment at the conductive heating station.

The welding irons 31, as well as first plate member 28, second plate member 29 and rod member 25, will retract to their original positions in relation to the indexing turntable 12. At this time, the safety proximity switch 18c within conductive heating assembly 15 will be activated to permit rotation of the turntable 12 to be resumed once the time relay times out. This switch is activated when the welding irons 31 and other elements of the conductive heating assembly 15 are in their uppermost positions to ensure that rotation of turntable 12 does not commence prior to the full retraction of these elements.

The workpiece holder 14a is then indexed to work station B where an operator manually places a pre-cut piece of material, in this case an oval-shaped piece of polyurethane foam 53 onto the polypropylene substrate 50 with the raised and softened areas. An example of the type of polyurethane foam contemplated for use with the present invention is one having a density of approximately thirty pores per inch and is 0.125" in gauge. One skilled in the art will recognize, however, that the material to be bonded to the plastic substrate 50 by the present invention can be covering material of any type.

Figure 17:
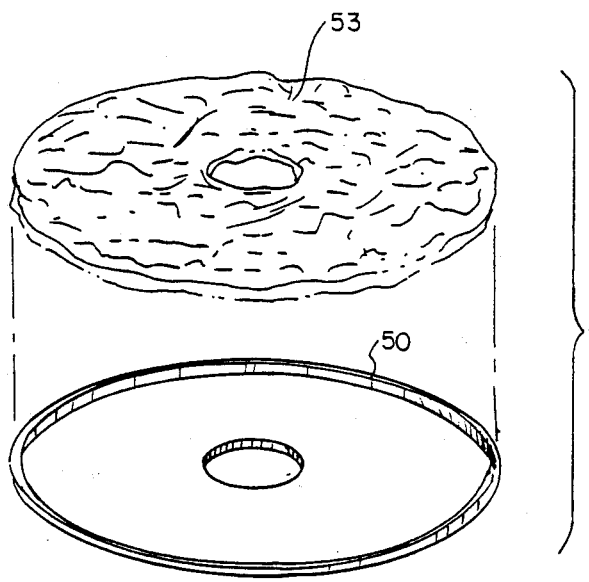
FIG. 17 is an exploded perspective view of the polypropylene substrate having eight circular beads of softened and raised polypropylene as a result of treatment at the conductive heating station and a precut sheet of polyurethane foam as it is to be placed on the polypropylene substrate.

FIG. 17 shows the polyurethane foam 53 as it is placed onto the heat treated polypropylene substrate 50. It should be noted that it is possible to formulate an automated system for placing the foam 53 onto the substrate 50, perhaps a shuttling system at the compression station immediately prior to compression. Such a shuttling system would include a member similar to the cover 22 of the workpiece holder 14 on which the foam could be deposited. That member would then slide into position over the treated polypropylene prior to compression.

The indexing time, that is the time from which the polypropylene workpiece 50 is treated at the conductive heating asembly 15 to the time that the compression platens 37 compress the polyurethane foam 53, is of particular concern in the present invention. If this indexing time is elongated the raised and softened area 51 of the polypropylene workpiece 50 will solidify or partially solidify thus preventing an effective bond from being made between the polyurethane foam 53 and the polypropylene workpiece 50. The ambient temperature during operation plays the most important role in determining the indexing time. For instance, an indexing time of 2.8 seconds prevents the hardening of the bead 51 before compression when the ambient temperature is approximately 75° Farenheit. The inventor herein has discovered, however, that if the indexing time can be limited within the range of 1.9-2.4 seconds, then the effect of the ambient temperature can be disregarded. This discovery holds true at least with respect to thermoplastic plastics such as polypropylene.

One skilled in the art will readily recognize that a shuttling system such as the one described above would permit the compression assembly 16 to be closer to the conductive heating assembly 15, effectively reducing the indexing time.

Figure 13A:
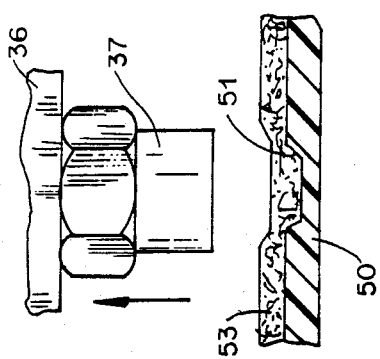
FIG. 13a is a broken away cross-sectional side view of an individual compression platen and the polypropylene substrate as prepared at the conductive heating station (FIGS. 12a-12d) with a precut polyurethane foam sheet placed on top of the raised and softened polypropylene.
Figure 13B:
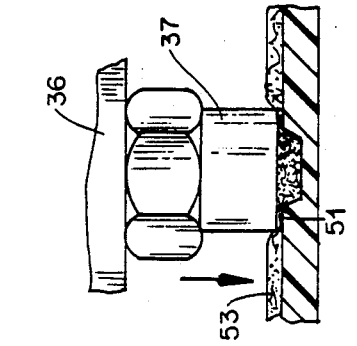
FIG. 13b is a broken away cross-sectional side view of the individual compression platen, polypropylene substrate after treatment at the conductive heating station and the precut polyurethane foam sheet, all shown in FIG. 13a, wherein the individual compression platen begins to apply pressure to the polyurethane foam sheet in the area of the raised and softened polypropylene.
Figure 13C:
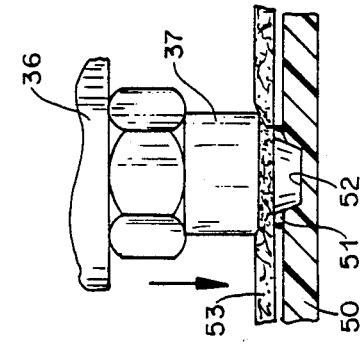
FIG. 13c is a broken away cross-sectional side view of the individual compression platen, polypropylene substrate and polyurethane foam sheet, all shown in FIG. 13a, wherein the individual compression platen has fully compressed the polyurethane foam and polypropylene substrate, effectively flattening the raised and softened polypropylene so as to bond the polyurethane foam to the polypropylene substrate.
Figure 13D:
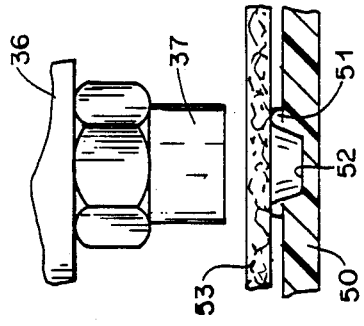
FIG. 13d is a broken away cross-sectional side view of the individual compression platen, polypropylene substrate and polyurethane foam sheet, all shown in FIG. 13a, wherein the individual compression platen is shown in its retracted position and the polyurethane foam is bonded to the polypropylene substrate forming a composite laminated structure.
Figure 14:
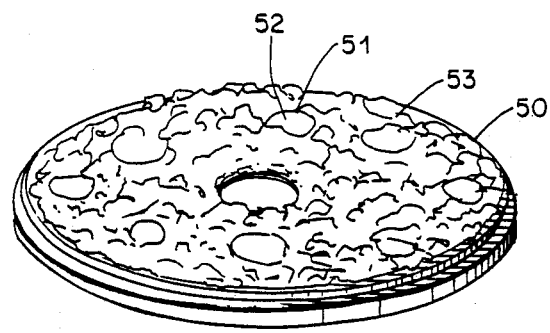
FIG. 14 is a perspective view of a composite laminated structure made in accordance with the apparatus and method of the present invention, as illustrated in the preceding Figures.

Once the workpiece holder 14a is in alignment with compression plate member 36, air at a pressure of 80 PSI is introduced into the compression cylinder 35 to actuate the slide valve within cylinder 35 to descend the compression rod member 34, compression plate member 36 and compression platens 37 as shown in FIGS. 13a-13c. As these Figures illustrate, the individual compression platen 37 shown therein compresses the polyurethane foam 53 into the raised and softened bead 51 formed by the tapered point 31a of welding iron 31. At its lowest point, the compression platen 37 contacts the surface of the polyurethane workpiece 50, to flatten the raised and softened bead 51 which is now fused with the polyurethane foam 53. Once the downward motion of compression platen 37 is completed, air is introduced to the opposite side of the slide valve within cylinder 35 to retract the compression platen 37, compression plate member 36 and compression rod member 34, as shown in FIG. 13d. As with the conductive heating assembly 15, a safety proximity switch within cylinder 35 permits the reactivation of the turntable 12 which indexes the workpiece holder 14a back to loading station A or any work station between the compression platen assembly 16 and loading station A. During such rotation to loading station A the flattened bead 51 is permitted to cool effectively bonding the polyurethane foam 53 to the polypropylene workpiece 50 through the pores of polyurethane foam 53. After the flattened bead 51 has sufficiently cooled, the finished product, a composite laminated structure 54, can be removed from the workpiece holder 14a.

The product of the present invention consists of a composite laminated structure such as those shown in FIGS. 14, 18, 18a, 18b and 18c. Reference should also be made to FIG. 13d since it shows an enlarged portion of the composite laminated structure 54. The detail of the bonding between the laminate and the substrate can be seen clearly in FIG. 18c, an enlarged partial cross-section of the composite laminated structure 54.

Thus, the aforementioned Figures show a polypropylene substrate 50 having a plurality of depressions 52 which include about their periphery flattened rings or beads 51 of polypropylene. A sheet of polyurethane foam 53 or the like is bonded to the polypropylene substrate 50 by means of these flattened rings or beads 51. This is accomplished by the rings or beads 51 fusing the polyurethane foam 53 to the polypropylene material through the fibers and pores of the polyurethane foam 53, effectively anchoring the polyurethane foam material within the flattened circular bead 51.

Figures 18A, 18C:
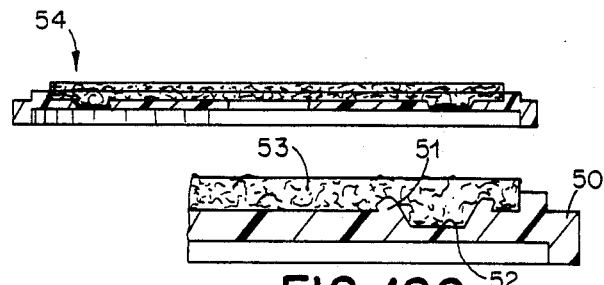
FIG. 18a is an enlarged cross-sectional side view of the composite laminated structure shown in FIG. 18 taken on line 18a—18a thereof.
FIG. 18c is an enlarged partial cross-section of the composite laminated structure shown in FIG. 18a, illustrating the fusing of the polyurethane foam fibers to the flattened bead of polypropylene.

Specific reference to FIG. 18c reveals that the polyurethane foam will, in most instances, fill the depression 52 so that the loss of polyurethane foam cushion or adhering surface in the area of the depression 52 and bead 51 is minimal. FIG. 18c further shows the manner in which the fibers of the polyurethane foam material is fused within the flattened bead 51 to create a strong bond between the two materials.

Although the Figures herein show an oval-shaped composite laminated structure 54 having an oval-shaped pattern of depression 52 and flattened beads 51, it should be clear to one skilled in the art that the composite laminated structure 54 contemplated by the present invention attaches to any size, shape or form of a thermoplastic substrate having a laminate of polyurethane foam material or any other material which has heretofore resisted bonding to such plastic substrates by conventional methods. It should also be clear that the number or arrangement of depressions 52 and flattened beads 51 can be varied in accordance with the particular application.

The composite laminated structure 54 described above and illustrated in the drawings is now available for a variety of applications. The specific application which prompted the present invention, that is, utilizing the fibers and pores of the polyurethane foam material to anchor to the polypropylene substrate a chemical composition such as deodorant and/or anti-perspirant, exemplifies the type of applications broadly contemplated by the present invention.

Thus, a relatively simple mechanical apparatus and method for manufacturing a composite laminated structure of polyurethane foam and polypropylene has been described.

It is to be understood that the invention is not to be limited to the specific construction or arrangement of the elements described herein and shown in the drawings but that it is entirely within the spirit of the present invention to make modifications within the invention defined by the Claims.

What is claimed is:

1. An apparatus for bonding a low density material to a thermoplstic plastic substrate comprising,
   a. a base;
   b. a rotary turntable rotatably connected to the base;
   c. at least one workpiece holder on the turntable to secure at least one thermoplastic plastic substrate to the turntable;
   d. a conductive heating assembly including,
      i. at least one descendible and retractable welding iron for contacting the plastic substrate,
      ii. a heating element for heating said at least one welding iron to a predetermined temperature; and
      iii. means for actuating the descending movement of the at least one welding iron to melt the plastic substrate only at the points of contact;
   e. a compression assembly including at least one descendible and retractable compression platen to emboss the low density material into the melted areas of plastic;
   f. means for controlling the rotation of the turntable; and
   g. means for controlling the descending and retracting movement of the at least one welding iron and at least one compression platen.

2. The apparatus claimed in claim 1 wherein the at least one welding iron is tapered and is circular in cross-section to facilitate the forming of a raised circular bead of molten plastic at the point of contact.

3. The apparatus claimed in claim 1 wherein the descending and retracting movement of the at least one welding iron and at least one individual compression platen and the movement of the work surface is accomplished pneumatically.

4. The apparatus claimed in claim 1 wherein the means to control the descending and retracting movement of the at least one welding iron and at least one individual compression platen and movement of the work surface, includes proximity switches which sense the position of the at least one workpiece holder in relation to the conductive heating assembly and the compression assembly.

5. The apparatus claimed in claim 4 wherein the rotary turntable is a circular indexing turntable having metal nibs fixed to its peripheral edge at predetermined locations to activate the respective proximity switches.

6. The apparatus claimed in claim 5 wherein timer relay coils are utilized to control the movement of the turntable, welding irons and compression platens.

7. The apparatus claimed in claim 1 wherein there are eight individual welding irons in an oval-shaped pattern and eight individual compression platens in a corresponding oval-shaped pattern.

8. The apparatus claimed in claim 1 wherein the at least one welding iron is made of aluminum.

* * * * *